United States Patent
Schindele

(10) Patent No.: US 10,427,600 B2
(45) Date of Patent: Oct. 1, 2019

(54) MOTOR VEHICLE SOUND GENERATOR SYSTEM

(71) Applicant: Faurecia Emissions Control Technologies, Germany GmbH, Augsburg (DE)

(72) Inventor: Tobias Schindele, Augsburg (DE)

(73) Assignee: Faurecia Emissions Control Technologies (DE)

(*) Notice: Subject to any disclaimer, the term of this patent is extended or adjusted under 35 U.S.C. 154(b) by 0 days.

(21) Appl. No.: 15/968,843

(22) Filed: May 2, 2018

(65) Prior Publication Data

US 2018/0319333 A1    Nov. 8, 2018

(30) Foreign Application Priority Data

May 2, 2017    (DE) .................. 10 2017 109 372

(51) Int. Cl.

| G10K 15/02 | (2006.01) |
| H04R 1/02 | (2006.01) |
| H04R 3/00 | (2006.01) |
| G10K 11/22 | (2006.01) |
| G10K 15/04 | (2006.01) |
| H04R 9/18 | (2006.01) |
| B60Q 5/00 | (2006.01) |

(52) U.S. Cl.
CPC .............. *B60Q 5/00* (2013.01); *G10K 11/22* (2013.01); *G10K 15/02* (2013.01); *G10K 15/04* (2013.01); *H04R 1/025* (2013.01); *H04R 3/00* (2013.01); *H04R 9/18* (2013.01); *H04R 2499/13* (2013.01)

(58) Field of Classification Search
USPC .................... 381/86, 71.4, 365, 389, 302
See application file for complete search history.

(56) References Cited

U.S. PATENT DOCUMENTS

| 9,681,218 B2 | 6/2017 | Sulowski et al. | |
| 2011/0192152 A1 | 8/2011 | Wirth | |
| 2011/0194705 A1* | 8/2011 | Gautama | H03F 1/30 381/59 |
| 2014/0376733 A1* | 12/2014 | Pommerer | H04R 3/002 381/71.4 |
| 2015/0230012 A1* | 8/2015 | Schadler | H04R 1/02 381/86 |
| 2017/0008453 A1 | 1/2017 | Hillers | |

FOREIGN PATENT DOCUMENTS

| DE | 19704376 A1 | 8/1998 |
| DE | 102013014455 A1 | 3/2015 |

* cited by examiner

*Primary Examiner* — Yosef K Laekemariam
(74) *Attorney, Agent, or Firm* — Carlson, Gaskey & Olds, P.C.

(57) ABSTRACT

A motor vehicle sound generator system has a housing in which a loudspeaker is accommodated. The housing has at least a first orifice and a second orifice. The orifices each have a sound transmission member provided thereon. The first orifice is arranged in a front side region of the loudspeaker and the second orifice is arranged in a rear side region of the loudspeaker as viewed in an axial direction of the loudspeaker. The sound generator system has a first sound outlet opening that is associated with the first orifice and a second sound outlet opening that is associated with the second orifice. The sound exits into open air through the first and second sound outlet openings, with the first and second sound outlet openings being free of exhaust gas flow.

19 Claims, 2 Drawing Sheets

MOTOR VEHICLE SOUND GENERATOR SYSTEM

CROSS-REFERENCE TO RELATED APPLICATION

This application claims priority to DE 10 2017 109 372.9, filed May 2, 2017.

FIELD OF INVENTION

The invention relates to a motor vehicle sound generator system

BACKGROUND

Sound generator systems serve a variety of purposes in motor vehicles. For example, sound generator systems are used for actively dampening sound in an exhaust gas system and thus for reducing acoustic emissions of motor vehicles having internal combustion engines. Furthermore, sound emission signatures of a motor vehicle can be adapted and individually designed by a sound generator system. In particular, in the case of motor vehicles which are at least partly electrically operated and have low acoustic emission in electrical operation, sound generator systems also serve to warn pedestrians and other road users of the presence of the vehicle.

Usually, loudspeakers of sound generator systems are accommodated in a housing. The housing is necessary because sound waves in a region in front of the loudspeaker and in a region behind the loudspeaker have opposing phases. The housing prevents a superposition and thus destructive interference of the sound waves from both regions. Although this structure improves radiation characteristics of the loudspeaker in a region in front of the loudspeaker, the sound waves radiated into the rear region of the housing remain unused, which also leaves the energy applied to generate these sound waves unused.

It is therefore the object of the invention to provide a sound generator system for a motor vehicle that makes the most optimum use of an entirety of sound waves radiated by the loudspeaker.

SUMMARY OF INVENTION

The invention provides a motor vehicle sound generator system including a housing in which a loudspeaker is accommodated. The housing has at least a first orifice and a second orifice. The orifices each have a sound transmission member provided thereon. The first orifice is arranged in a front side region of the loudspeaker and the second orifice is arranged in a rear side region of the loudspeaker as viewed in an axial direction of the loudspeaker. The motor vehicle sound generator system has a first sound outlet opening that is associated with the first orifice and a second sound outlet opening that is associated with the second orifice. The sound exits into open air through the first and second sound outlet openings, and the first and second sound outlet openings are free of exhaust gas flow.

A sound generated by the loudspeaker can be conducted into the open air both from a front side region of the loudspeaker and from a rear side region of the loudspeaker through the two orifices and can thus be utilized, in particular in order to generate a desired vehicle sound, and/or to warn pedestrians and other road users. The motor vehicle sound generator system is not part of the exhaust system here, but may be provided in addition to and separately from the exhaust system, or, in the case of a purely electrically powered vehicle, as the only sound generator system.

Preferably, the loudspeaker has an axial central axis which extends substantially in a horizontal plane, more particularly is oriented in the longitudinal direction of the vehicle. This is of advantage in particular when a sound is to be transmitted toward the rear of the vehicle and/or toward the front of the vehicle since in this configuration of the invention, the loudspeaker emits sound waves levelly in these two directions.

A further aspect provides that central axes of the orifices include an angle of from 120 degrees to 180 degrees, in particular between 125 degrees and 145 degrees. The central axis of an orifice here is to be understood to mean that axis which is perpendicular to the minimal surface in the geometric center of gravity of the minimal surface bounded by the orifice. Proceeding from the point of intersection of the central axes, the angle between the two beams forming the central axes is to be measured at the angle included by the central axes. In this configuration of the invention, sound can also be directed to such regions of the motor vehicle which are offset relative to each other with respect to a longitudinal axis of the motor vehicle.

According to one configuration of the invention, provision is made that a first sound transmission member is provided between the first orifice and the first sound outlet opening and/or a second sound transmission member is provided between the second orifice and the second sound outlet opening. Sound can be conducted to desired regions of the motor vehicle via the sound transmission members.

The sound transmission members may be designed asymmetrically in relation to each other. In this way, sound waves that are radiated by the sound generator system into the open air and originate from a front side region of the loudspeaker and a rear side region of the loudspeaker do not have opposing phases, as a result of which destructive interference of the sound waves is prevented.

Preferably, the first sound transmission member is formed as a pipe. This increases a resonance volume of the front side region of the loudspeaker, resulting in the occurrence of resonance even at lower sound frequencies and the lower sound frequencies being radiated with an increased sound pressure.

It is further preferred that the pipe extends to a vehicle rear end and/or that a pipe end is configured as an exhaust pipe end. In particular, the pipe end is located under the vehicle rear end and terminates in or under a rear apron to be visible. This creates the impression of a real exhaust system, both acoustically and visually.

According to a further configuration of the invention, the sound transmission member provided at the first and/or the second orifice is a hollow sound conducting member having an outer wall, in particular wherein the outer wall is stiff, perforated at least in sections, or micro-perforated at least in sections. This increases a resonance volume of the rear side region of the loudspeaker, resulting in the occurrence of resonance even at lower sound frequencies and the lower sound frequencies being radiated with an increased sound pressure. Sound is conducted toward the front of the vehicle via the sound conducting member and is transmitted into the open air at one or several desired points. For this purpose, it may be provided that at those points where more sound is intended to exit into the open air, the sound conducting member is at least partly perforated, at least partly micro-perforated, or completely micro-perforated.

Preferably, the second sound conducting member is a pipe which includes at least one coupling-in opening for the sound and at least one sound exit opening. A pipe length is selected such that a desired sound resonance volume is generated for the rear side region of the loudspeaker. Further, a plurality of openings may be provided, as a result of which an acoustic coupling of the sound conducting member to the environment is increased.

The sound conducting member at the first and/or second opening is more particularly a pipe having a circular inside cross-section that is constant over the length of the pipe.

According to a different aspect, the sound conducting member(s) is/are a pipe having a circular inside cross-section that is variable over the length of the pipe.

Alternatively, the sound conducting member(s) is/are in the form of a pipe having a non-circular inside cross-section that is constant over the length of the pipe. The inside cross-section is, for example, elliptical or has the shape of a simple polygon (edges of the polygon touch/intersect only in the vertices).

According to a further aspect, the second sound conducting member is a pipe having a non-circular inside cross-section that is variable over the length of the pipe.

It is further preferred that the first and/or the second sound conducting member include(s) at least one closure member. The closure member may be an actuatable valve, a closing plug or a protective grid. Furthermore, two or more such closure members may also be provided. The sound resonance volume of the rear side region of the loudspeaker can be reducible by the closure member.

A further aspect provides that the at least one closure member is provided at the beginning or the end of the sound conducting member. In particular, a closure member provided at the beginning of the sound conducting member, i.e. on the loudspeaker side, allows the sound conducting member to be acoustically decoupled from the rear side region of the loudspeaker, as a result of which the sound emission from the rear side region of the loudspeaker into the open air can be reduced. Alternatively or additionally, a second closure member formed as a protective grid may be provided at the end of the sound conducting member, i.e. on the sound outlet opening side, whereby the sound generator system is protected from contamination.

As an alternative, the second closure member may be formed as an actuatable valve or as a plug via which a sound transmission from the second sound transmission member through the second sound outlet opening into the open air can be reduced, more particularly eliminated. In this configuration, the first closure member may be omitted, and an acoustic resonance volume of the rear side region of the loudspeaker is enlarged, resulting in resonance occurring even at lower sound frequencies.

According to one configuration of the invention, provision is made that the sound transmission member provided at the second orifice is a diaphragm, in particular wherein the diaphragm is hole-free, at least partially perforated, or at least partially micro-perforated. The diaphragm may also be completely micro-perforated. The term micro-perforated here should be understood to mean a perforation having a perforation degree of 1% to 10% and a surface area of the orifices of 50 μm² to 1 mm². The diaphragm may, for example, be formed as a thin metal sheet. This allows the sound pressure, and thus the volume, to be adjusted at which sound generated by the loudspeaker is transmitted from the rear side region of the loudspeaker into the open.

According to one configuration of the invention, a heater is provided which is configured to at least partially heat the sound generator system, depending on an ambient temperature. In this way, any parts of the sound generator system that are sensitive to cold are prevented from being damaged at low ambient temperatures.

DETAILED DESCRIPTION

Figure 1:
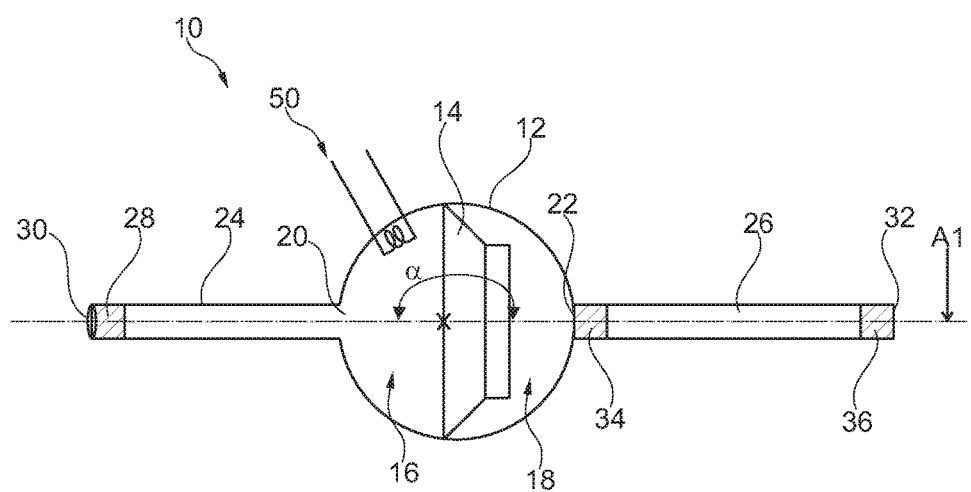
FIG. 1 shows a longitudinal section taken through a sound generator system according to the invention.

FIG. 1 shows a sound generator system 10 having a housing 12 and a loudspeaker 14 accommodated in the housing 12. The loudspeaker 14 is accommodated in the housing 12 such that the housing 12, viewed in the direction of an axial central axis A1 of the loudspeaker 14 which extends substantially in a horizontal plane, is divided into a front side region 16 of the loudspeaker 14 and a rear side region 18 of the loudspeaker 14. The two regions 16, 18 may be separated from each other so as to be gas-tight.

Sound waves emitted by the loudspeaker 14 therefore cannot directly propagate through air between the two side regions 16, 18.

The loudspeaker 14 is either complementary to an inside cross-section of the housing 12, or a partition divides the housing 12 into the two side regions 16, 18.

Sound waves emitted by the loudspeaker 14 in the front side region 16 and in the rear side region 18 have opposite phases. The separation of the two side regions 16, 18 prevents the sound waves from canceling each other out by interference.

The housing 12 includes a first orifice 20 which is arranged in the front side region 16 of the loudspeaker 14. The housing 12 further includes a second, opposite, orifice 22 in the rear side region 18. In the sound generator system 10 shown in FIG. 1, central axes of the orifices 20, 22 coincide, that is, they include an angle of 180 degrees. The central axis of an orifice here is to be understood to mean that axis which, in the geometric center of gravity of the minimal surface bounded by the orifice, is perpendicular to the minimal surface. However, as is illustrated as an example in FIG. 3 by dashed lines, the central axes may also intersect at an angle α as small as 120 degrees, for example 125 degrees to 145 degrees.

The first orifice 20 and the second orifice 22 have a first sound transmission member 24 and, respectively, a second sound transmission member 26 provided thereon. The sound transmission members 24, 26 of the sound generator system 10 shown in FIG. 1 are each formed as an, e.g., linear pipe having a coupling-in opening for the sound and at least one sound exit opening.

Figure 2:
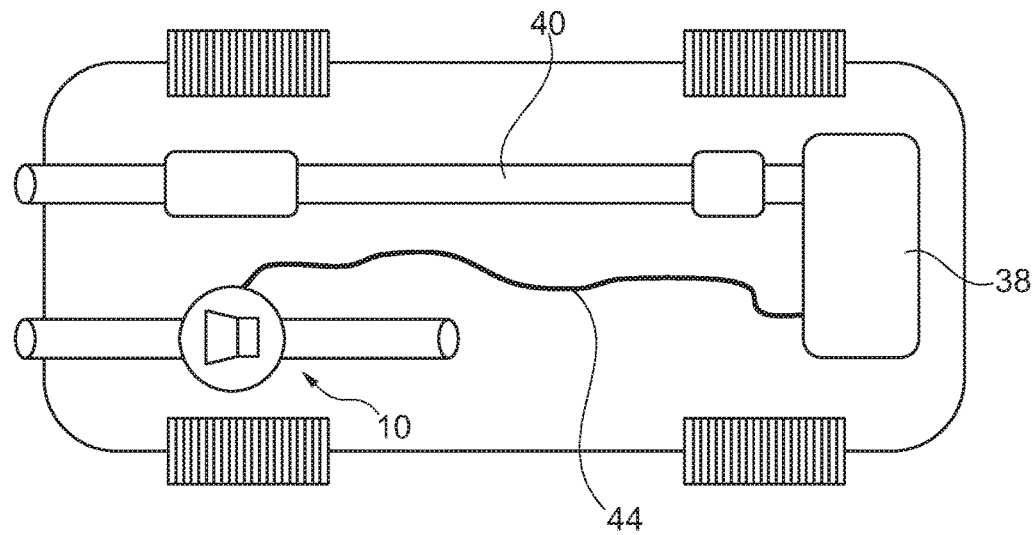
FIG. 2 shows a schematic illustration of a motor vehicle with an internal combustion engine and the sound generator system of FIG. 1 according to the invention.
Figure 3:
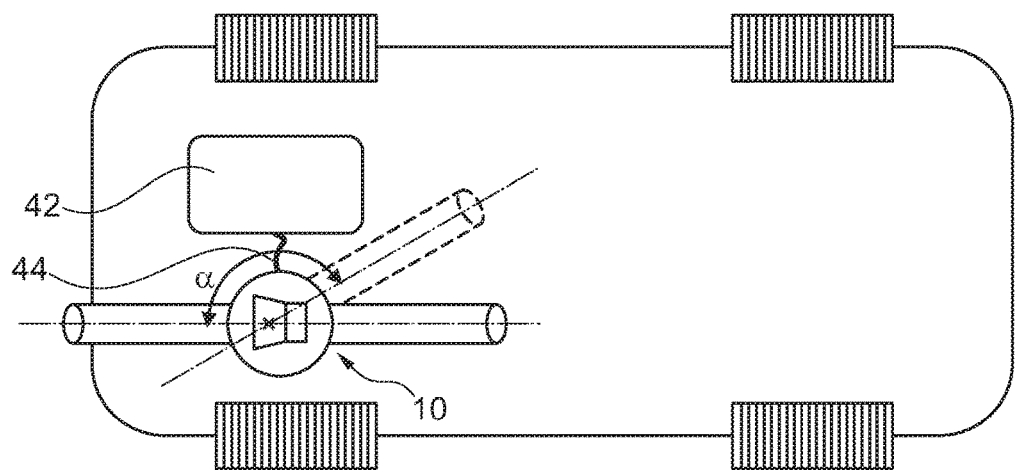
FIG. 3 shows a schematic illustration of an electrically operated motor vehicle with the sound generator system of FIG. 1 according to the invention.

As shown in FIGS. 2 and 3, the first sound transmission member 24 extends from the housing 12 toward the rear end of the vehicle. In particular, the first sound transmission member 24 here terminates in/under a rear apron of the motor vehicle so as to be visible.

Furthermore, a vehicle rear-side pipe end 28 of the first sound transmission member 24 is designed as an exhaust pipe end such that an end of a real exhaust system is imitated acoustically and/or visually.

Sound generated by the loudspeaker 14 in the front side region 16 is conducted from the front side region 16 of the loudspeaker 14 to the vehicle rear end via the first sound transmission member 24 and exits into the open air through a first sound outlet opening 30. The first sound transmission member 24 is formed as a sound conducting member.

The second sound transmission member 26 extends from the housing 12 toward the front of the vehicle. Sound generated by the loudspeaker 14 is conducted from a rear side region 18 of the loudspeaker 14 toward the front of the vehicle via the second sound transmission member 26 and exits below the vehicle into the open air through a second sound outlet opening 32. The second sound transmission member 26 is formed as a sound conducting member.

Provided at the second orifice 22 is a closure member 34, in particular an actuatable valve, via which a sound transmission from the rear region 18 of the loudspeaker 14 into the second sound transmission member 26 can be reduced, more particularly eliminated. The closure member 34 here is provided at the beginning of the sound transmission member 26, that is, at a loudspeaker side end of the sound transmission member 26. The closure member 34 thus allows the second sound transmission member 26 to be acoustically decoupled from the rear side region 18 of the loudspeaker 14.

In addition, a second closure member 36, which is formed as a protective grid, is fixed to the second sound outlet opening 32, i.e. at the end of the second sound transmission member 26. The second closure member 36 protects the sound generator system 10 against dirt. The protective grid may be at least partly perforated, at least partly micro-perforated, or completely micro-perforated. Selecting the perforation allows the sound pressure of the sound transmitted into the open air through the protective grid to be adjusted.

Alternatively, the second closure member 36 may be formed as an actuatable valve or as a plug via which a sound transmission from the second sound transmission member 26 through the second sound outlet opening 32 into the open air can be reduced, more particularly eliminated. In this configuration, the first closure member 34 may be omitted, and an acoustic resonance volume of the rear side region 18 of the loudspeaker 14 is enlarged, which results in the occurrence of resonance even at lower sound frequencies.

Outer walls of the two sound transmission members 24, 26 are formed to be hole-free here. However, they each may also be perforated at least in sections, micro-perforated at least in sections, or completely micro-perforated. Via the additional openings formed thereby, the sound transmission members 24, 26 are, in some areas, acoustically coupled more strongly to the environment, as a result of which a sound pressure transmitted into the open air increases, more particularly can be adapted. Selecting the perforation allows the sound pressure of the sound transmitted into the open air to be adjusted.

The term micro-perforated here is to be understood to mean a perforation having a perforation degree of 1% to 10% and a surface area of the openings of 50 $\mu m^2$ to 1 $mm^2$.

FIGS. 2 and 3 schematically show a motor vehicle with an internal combustion engine 38 and an exhaust system 40 or with an electric power system 42.

The sound generator system 10 is driven by a control system (not illustrated in more detail) of the internal combustion engine 38 (FIG. 2) or of the electric power system 42 (FIG. 3) via a control line 44, based on operating parameters.

In the sound generator system 10 shown in FIG. 2, it is clearly apparent that there is no flow of exhaust gas through the sound outlet openings 30, 32 of the sound generator system 10. In particular, the sound generator system 10 is decoupled from the exhaust system 40 of the motor vehicle inasmuch as an exchange of air between the sound generator system 10 and the exhaust system 40 is not possible directly, but only via the open air.

The sound generator system 10 may, however, be acoustically coupled to the exhaust system 40 in such a way that by an active sound generation, sound emissions of the internal combustion engine 38 via the exhaust system 40 can be reduced by destructive interference. The sound generator system then serves as an active muffler.

The operating parameters may include one or more of the following variables: current speed of the internal combustion engine 38 or of the electric power system 42, velocity of the vehicle, speed of the tires, and a signal from a detection system additionally provided in the vehicle that other road users are in the vicinity of the vehicle and/or approach the vehicle.

On the basis of the control signals from the control system, the sound generator system 10 generates a desired sound signature as described above, in other words a desired sound, or acoustically warns other road users of the presence of the vehicle.

The sound generator system 10 may, of course, also be used in hybrid vehicles, which include both an internal combustion engine 38 and an electric power system 42. Control of the sound generator system 10 is then performed based on the above-mentioned operating parameters by a control system of the internal combustion engine 38 and/or by a control system of the electric power system 42.

To protect the sound generator system 10 at low ambient temperatures, a heater 50 may be provided. The heater 50 allows the sound generator system 10 to be at least partially heated. In particular, components that are sensitive to cold, such as, e.g., a diaphragm of the loudspeaker 14, can be heated. This prevents components sensitive to cold from being damaged due to low ambient temperatures.

Alternative embodiments of the sound generator system 10 are given by changes in the cross-section, in particular the inside cross-section of the second sound transmission member 26, which are described below.

In accordance with an alternative embodiment, the first and/or second sound transmission member(s) 24, 26 is/are a pipe having a circular inside cross-section that is constant over the length of the pipe.

In accordance with a different embodiment, the first and/or second sound transmission member(s) 24, 26 is/are a pipe having a circular inside cross-section that is variable over the length of the pipe.

Alternatively, the first and/or second sound transmission member(s) 24, 26 is/are formed as a pipe having a non-circular inside cross-section that is constant over the length of the pipe. The inside cross-section is, for example, elliptical or has the shape of a simple polygon (edges of the polygon touch/intersect only in the vertices).

Further, the first and/or second sound transmission member(s) 24, 26 may be a pipe having a non-circular inside cross-section that is variable over the length of the pipe.

Selecting the inside cross-section allows a sound characteristics of the sound transmission member to be adjusted.

The invention claimed is:

1. A motor vehicle sound generator system comprises:
   a housing in which a loudspeaker is accommodated, wherein the housing includes at least a first orifice and a second orifice, and wherein the first and second orifices each have a sound transmission member provided thereon, and wherein the first orifice is arranged in a front side region of the loudspeaker and the second orifice is arranged in a rear side region of the loudspeaker as viewed in an axial direction of the loudspeaker;

a first sound outlet opening that is associated with the first orifice; and a second sound outlet opening that is associated with the second orifice, wherein sound exits into open air through the first and second sound outlet openings, and wherein the first and second sound outlet openings are free of exhaust gas flow.

2. The motor vehicle sound generator system according to claim 1, wherein the loudspeaker has an axial central axis which extends substantially in a horizontal plane.

3. The motor vehicle sound generator system according to claim 2, wherein the axial central axis is oriented in a longitudinal direction of a vehicle.

4. The motor vehicle sound generator system according to claim 1, wherein central axes of the first and second orifices include an angle of from 120 degrees to 180 degrees.

5. The motor vehicle sound generator system according to claim 1, wherein a first sound transmission member is provided between the first orifice and the first sound outlet opening and/or a second sound transmission member is provided between the second orifice and the second sound outlet opening.

6. The motor vehicle sound generator system according to claim 5, wherein the first sound transmission member is formed as a pipe.

7. The motor vehicle sound generator system according to claim 6, wherein the pipe extends to a vehicle rear end.

8. The motor vehicle sound generator system according to claim 6, wherein a pipe end of the pipe is configured as an exhaust pipe end.

9. The motor vehicle sound generator system according to claim 5, wherein the sound transmission member provided at the first and/or the second orifice is a hollow sound conducting member having an outer wall.

10. The motor vehicle sound generator system according to claim 9, wherein the outer wall is stiff, perforated at least in sections, or micro-perforated at least in sections.

11. The motor vehicle sound generator system according to claim 9, wherein the second sound transmission member is the hollow sound conducting member that comprises a pipe which includes at least one coupling-in opening for the sound and at least one sound exit opening.

12. The motor vehicle sound generator system according to claim 9, wherein at least one hollow sound conducting member includes at least one closure member.

13. The motor vehicle sound generator system according to claim 12, wherein the at least one closure member is provided at a beginning or an end of the hollow sound conducting member.

14. The motor vehicle sound generator system according to claim 5, wherein the second sound transmission member provided at the second orifice is a diaphragm.

15. The motor vehicle sound generator system according to claim 14, wherein the diaphragm is hole-free, at least partially perforated, or at least partially micro-perforated.

16. The motor vehicle sound generator system according to claim 1, wherein a heater is provided which is configured to at least partially heat the sound generator system, depending on an ambient temperature.

17. The motor vehicle sound generator system according to claim 1, wherein the loudspeaker is positioned within the housing such that the housing is divided into the front side region and the rear side region which are separated from each other in a gas-tight configuration, and wherein the first orifice opens into the front side region and the second orifice opens into the rear side region.

18. A motor vehicle sound generator system comprises:
a housing in which a loudspeaker is accommodated, wherein the housing includes at least a first orifice and a second orifice, and wherein the first and second orifices each have a sound transmission member provided thereon, and wherein the first orifice is arranged in a front side region of the loudspeaker and the second orifice is arranged in a rear side region of the loudspeaker as viewed in an axial direction of the loudspeaker;

a first sound outlet opening that is associated with the first orifice; and a second sound outlet opening that is associated with the second orifice, wherein sound exits into open air through the first and second sound outlet openings, and wherein the first and second sound outlet openings are free of exhaust gas flow, wherein a first sound transmission member is provided between the first orifice and the first sound outlet opening and/or a second sound transmission member is provided between the second orifice and the second sound outlet opening, wherein the sound transmission member provided at the first and/or the second orifice is a hollow sound conducting member having an outer wall, and wherein at least one hollow sound conducting member includes at least one closure member.

19. A motor vehicle sound generator system comprises:
a housing in which a loudspeaker is accommodated, wherein the housing includes at least a first orifice and a second orifice, and wherein the first and second orifices each have a sound transmission member provided thereon, and wherein the first orifice is arranged in a front side region of the loudspeaker and the second orifice is arranged in a rear side region of the loudspeaker as viewed in an axial direction of the loudspeaker;

a first sound outlet opening that is associated with the first orifice; and a second sound outlet opening that is associated with the second orifice, wherein sound exits into open air through the first and second sound outlet openings, and wherein the first and second sound outlet openings are free of exhaust gas flow, wherein a first sound transmission member is provided between the first orifice and the first sound outlet opening and/or a second sound transmission member is provided between the second orifice and the second sound outlet opening, and wherein the second sound transmission member provided at the second orifice is a diaphragm.

* * * * *